(12) United States Patent
Jones (10) Patent No.: US 7,678,449 B2
(45) Date of Patent: Mar. 16, 2010

(54) IRIDESCENT MAGNETIC EFFECT PIGMENTS COMPRISING A FERRITE LAYER

(75) Inventor: Steven Jones, Budd Lake, NJ (US)

(73) Assignee: BASF Catalysts LLC, Florham Park, FL (US)

( * ) Notice: Subject to any disclaimer, the term of this patent is extended or adjusted under 35 U.S.C. 154(b) by 208 days.

(21) Appl. No.: 11/548,361

(22) Filed: Oct. 11, 2006

(65) Prior Publication Data

US 2008/0280150 A1 Nov. 13, 2008

Related U.S. Application Data (60) Provisional application No. 60/744,401, filed on Apr. 6, 2006, provisional application No. 60/803,918, filed on Jun. 5, 2006.

(51) Int. Cl.
*B05D 1/38* (2006.01)
*B05D 3/02* (2006.01)
*B32B 5/16* (2006.01)

(52) U.S. Cl. ............. 428/363; 427/215; 427/217; 427/376.6; 427/383.1; 427/383.3; 428/403; 428/404; 428/699; 428/701; 428/900

(58) Field of Classification Search ............. 427/212, 427/215, 217, 383.1, 383.3, 376.6, 419.2; 428/363, 403, 404, 699, 701, 900
See application file for complete search history.

(56) References Cited

U.S. PATENT DOCUMENTS

| | | | |
|---|---|---|---|
| 3,087,828 A * | 4/1963 | Linton | 106/417 |
| 3,087,829 A | 4/1963 | Linton | |
| 3,711,308 A | 1/1973 | Brand | |
| 4,038,099 A | 7/1977 | DeLuca, Jr. et al. | |
| 4,192,691 A | 3/1980 | Armanini | |
| 4,435,220 A | 3/1984 | Watanabe et al. | |
| 4,744,832 A | 5/1988 | Franz | |
| 4,867,793 A | 9/1989 | Franz et al. | |
| 5,273,576 A * | 12/1993 | Sullivan et al. | 106/418 |
| 5,344,488 A | 9/1994 | Reynders et al. | |
| 5,433,779 A | 7/1995 | DeLuca, Jr. | |
| 5,611,851 A | 3/1997 | DeLuca et al. | |

(Continued)

FOREIGN PATENT DOCUMENTS

JP 11-273932 10/1999

(Continued)

OTHER PUBLICATIONS

L.M. Greenstein, Nacreous (Pearlescent) Pigments and Interference Pigments, Pigment Handbook, vol. 1, pp. 829-858 (1988).

(Continued)

*Primary Examiner*—H. (Holly) T Le
(74) *Attorney, Agent, or Firm*—Bernard Lau (57) ABSTRACT

Iridescent magnetic pigments are produced by depositing a ferrite layer and a second metal oxide layer in succession on a substrate. The substrate may be platy and is coated with the ferrite, which is then coated with the second metal oxide layer to provide interference color effect. At least one of the layers is magnetic. The magnetic pigment may be used in coatings such as paints.

21 Claims, 6 Drawing Sheets

U.S. PATENT DOCUMENTS

| | | | |
|---|---|---|---|
| 5,759,255 A | 6/1998 | Venturini et al. | |
| 6,139,615 A * | 10/2000 | Jones | 106/418 |
| 6,290,766 B1 | 9/2001 | DeLuca, Jr. et al. | |
| 6,361,593 B2 * | 3/2002 | DeLuca et al. | 106/417 |
| 6,533,858 B1 * | 3/2003 | Cacace et al. | 106/418 |
| 6,794,037 B2 * | 9/2004 | Zimmermann et al. | 428/403 |
| 6,800,125 B2 * | 10/2004 | Zimmermann et al. | 106/415 |
| 6,821,333 B2 * | 11/2004 | Zimmermann et al. | 106/405 |
| 7,045,007 B2 * | 5/2006 | Bagala, Sr. | 106/415 |
| 7,226,503 B2 * | 6/2007 | Anselmann et al. | 106/489 |
| 7,241,503 B2 * | 7/2007 | Noguchi | 428/403 |
| 7,470,318 B2 * | 12/2008 | Cao et al. | 106/418 |
| 2004/0123779 A1 | 7/2004 | Bagala, Sr. et al. | |

FOREIGN PATENT DOCUMENTS

WO PCT/US2007/065705    7/2007

OTHER PUBLICATIONS

Tamio Noguchi, "Black Iron Oxide Coated Thin Filler Pigment", IFSCC, Yokohama, pp. 618-639 (Oct. 13-16, 1992).

* cited by examiner

FIG. 3
XRD PATTERNS FOR SAMPLES PRODUCED IN EXAMPLE 5

IRIDESCENT MAGNETIC EFFECT PIGMENTS COMPRISING A FERRITE LAYER

This patent application claims the benefit of pending U.S. Ser. No. 60/744,401 filed Apr. 6, 2006 and U.S. Ser. No. 60/803,918 filed Jun. 5, 2006 incorporated herein in their entireties.

FIELD

This patent application is directed to color effect materials. Specifically this patent application is directed to magnetic effect materials having iridescent properties.

BACKGROUND

In today's market, merchants are constantly looking for ways to improve the design of consumer products to render such goods unique and attractive and thereby increase revenue by sale of such products. The market for consumer goods is a competitive one. Colors and image affecting pigments are used to differentiate goods and/or improve the products' aesthetic appeal. As often is the case with plastic articles, color is achieved by incorporating colorants into plastic during molding or other forming processes. In the coloring of molded plastic articles or the incorporation of colorants in coatings, the colorants are often solid inorganic pigments. Pigments used to color goods comprise a vast industry.

Regardless of application or industry, merchants understand the importance of color and image affecting pigments in the sale of goods. Special color effects on articles drive new aesthetic trends, create more dynamic visual impact and improve brand recognition and product differentiation. To achieve color effects, often color effect pigments are employed. Effect pigments, such as pigments that induce iridescence, are used in a range of industries which includes articles such as molded plastics used for automobile or motorcycle finishes/coatings; sporting equipment such as helmets, skates, snowboards, skateboards; solid-surface applications such as kitchen countertops, bath vanities, or flooring including tiles; sanitary wares, such as sink basins, shower stalls or bath tubs; decorative articles, vases, bowls, containers, films, glitter, home sidings, and architectural coatings.

Often consumers make color the key reason for purchasing an article. The importance of color is particularly noticeable in consumers' decision for purchasing cars, home goods, and home appliances. Merchants realize how making available a range of colors or selecting a particular color for a specific good can greatly increase consumer appeal and thus revenue. This is evidenced by the plethora of colors offered for goods such as cars; cycles; household appliances including toasters, blenders, coffee makers; solid surfaces such as floor tiles and kitchen countertops; and in color trends dictated by fashion each season.

Marketing strategies have been developed that use color as a tool in attracting a specific gender to a product or in inviting and not alienating a gender to goods that have traditionally been geared to the opposite gender. For instance, today dark or neutral colors are used to invite males to purchase goods such as home wares, which had traditionally been purchased by females. Similarly, electronic casings such as casings for computers, telephones, portable music devices, digital organizers, etc. have been colored in bright colors to entice females to purchase those products.

The wide range of colors and color effects in the marketplace correlates to the advances in pigment technology. Pigments exist in both natural and synthetic forms. As mentioned above, color effect pigments are one type of pigment presently used to color articles. Normally metal oxides and variations thereof are used to provide these color effects. The color effect pigments are valued for imparting luster or iridescence. For instance, nacreous pigments produce pearl-like, metallic, and iridescent effects. A widely used type of color effect pigment comprises muscovite mica platelets coated with a metallic oxide, such as titanium dioxide. This type of pigment was first described in L. M. Greenstein, "Nacreous (Pearlescent) Pigments and Interference Pigments", *Pigment Handbook*, Volume 1, John Wiley & Sons, Inc., pages 829-858 (1988). The unique appearance of effect pigments is the result of multiple reflections and transmissions of light. The platelet substrate usually has a refractive index which is different from the coating and usually also has a degree of transparency. The coating is in the form of one or more thin films which have been deposited on the surfaces of the platelets. One important aspect of the coating on the platelet is that it must be smooth and uniform in order to achieve the optimum pearlescent appearance. The reason is that if an irregular surface is formed, light scattering occurs and the coated platelet will no longer function as an effect pigment. In addition, the coating should adhere strongly to the platelet or else the coating will become separated during processing, resulting in considerable breakage and loss of luster.

A relatively thin titanium dioxide coating produces a pearl-like or silvery luster. Mica platelets with thicker coatings produce color, even though the components are colorless, through the phenomenon of light interference. This type of coated platelet is known as an interference pigment. The color, called the reflection color, is seen most effectively by specular or mirror-like reflection, where the angle of reflection equals the angle of incidence. The reflection color is a function of optical thickness, i.e. the geometrical thickness times the refractive index, of the coating. Optical thickness of about 80 nm to about 140 nm produce reflections which may be called white, silvery or pearly while optical thicknesses of about 150 nm or more produce color reflections.

The pigments which are most frequently encountered on a commercial basis are titanium dioxide-coated mica and iron oxide-coated mica pigments. It is also well known that the metal oxide layer can be overcoated to achieve various desired effects. For instance, Linton, U.S. Pat. No. 3,087,828, describes mica coated with various oxides including those of titanium, iron, cobalt and chromium over which, if desired, a layer of calcined titanium dioxide can be positioned. Brand, U.S. Pat. No. 3,711,308, describes mica coated with a first layer which is a mixture of oxides of titanium and one or more metal oxides which can be, for instance, the oxides of iron, chromium and/or cobalt and a second layer of titanium dioxide. Franz, U.S. Pat. No. 4,744,832, describes coating mica with a layer of titanium dioxide and calcining to form two layers, an inner titanium dioxide layer and an outer pseudobrookite layer. A second layer of iron oxide is deposited and the pigment is recalcined.

Effect pigments need not only be mica-based, but may be glass-based or comprise other types of platelets. Commonly assigned U.S. Pat. Nos. 6,794,037; 6,800,125; and 6,821,333 disclose color effect materials. The effect materials are composed of a plurality of encapsulated substrate platelets in which each platelet is encapsulated with a highly reflective layer which acts as a reflector to light directed thereon, a spacer layer which is selectively transparent to light directed thereon, and optionally an iron oxide layer which may either be on the spacer layer or the highly reflective layer when present. Suitable highly light reflective layers may include for example, silver, gold, platinum, palladium, rhodium, ruthenium, osmium, iridium, or an alloy thereof. Suitable spacer pigment layers may include metal oxide, nitride, fluoride or carbide or polymer.

Tamio Noguchi, "Black Iron Oxide Coated Thin Filler Pigment", IFSCC, Yokohama, pages 618-639 (Oct. 13-16, 1992) and U.S. Pat. No. 4,867,793 teach $Fe_3O_4$ coated mica.

Pearlescent pigments containing ferrites are known in the art. For example, U.S. Pat. No. 5,344,488 and DE 4120747 describe the deposition of zinc oxide onto mica platelets which had been coated with iron oxide. It is also well-known that the metal oxide layer may be over-coated. For instance, said U.S. Pat. No. 3,087,828 describes the depositing $Fe_2O_3$ onto a $TiO_2$ layer while U.S. Pat. No. 3,711,308 describes a pigment in which there is a mixed layer of titanium and iron oxides on the mica that is overcoated with titanium dioxide and/or zirconium dioxide. See also U.S. Pat. No. 4,435,220.

Engelhard Corporation has been actively involved in the pigment arts. For instance, commonly assigned U.S. Pat. No. 6,139,615, which is Engelhard's Black Olive™ pigment, discloses pearlescent pigments containing ferrites. The '615 pigment is obtained by adding metal ions to a slurry of a hydrous iron compound and platy particles and then co-calcining the metal and hydrous iron oxide. Also, commonly assigned U.S. Pat. No. 6,361,593 discloses lustrous interference pigments with black absorption color. The '593 pigment comprises a mica coated with a first layer having a combination of hydrous titanium, iron and either cobalt or chromium oxides or both, and then coating the first layer with hydrous titanium and/or iron oxides.

The '593 pigment, publicized since 2002, is one example of Engelhard's wide array of pigments which is a black mica-based effect pigment having champagne undertones. The pigment displays shades of brown-black that had once been difficult to achieve with mica-based pigments and thereby produces a black, lustrous, pearlescent finish. The '593 pigment has been used in many diverse applications including molded-in plastic or coatings for electronic equipment, appliances, sporting goods and packaging, specialty decorative coatings and inks, coatings and inks for leather goods, solid-surface applications (i.e., countertops and flooring), automotive coatings, and architectural coatings.

However, in light of the ever-increasing importance of color and color effects to entice consumers, a continuous need exists to meet the full potential of pigment technology. Pigment technology must continue to evolve in light of consumer demand. For instance, consumers and merchants are desirous of products possessing magnetic pigments displaying shades other than brown-black and displaying interference colors. As mentioned earlier, advancements in the pigment technology are important in that goods having better eye-appeal may drive a consumer to purchase an item over less eye-appealing/attractive goods. A clear illustration of consumer demand is seen in the home goods market. Homeowners and homebuilders want quality or the appearance of quality wares when constructing or remodeling a home. Architectural designs using iridescent magnetic pigments may serve quite well when vying for customer dollars.

Thus, it is desirable to create new pigment compositions to produce magnetic pigments that have iridescent properties rather than brown-black properties. It is also desirable to produce designs or color patterns/effects having magnetic and iridescent properties and products possessing such properties to increase the articles' appeal. Equally desirable is a method to color an article with pigments to create new color variations, effects and/or color designs and patterns.

SUMMARY

The present patent application responds to the need in the art by providing iridescent magnetic effect pigments. The present pigments are produced by depositing a ferrite on a platy substrate and a second metal oxide layer deposited on the ferrite. Thus, the present patent application provides a magnetic effect pigment comprising: (a) a substrate; (b) at least one ferrite layer deposited on the substrate; and (c) deposited on the ferrite layer, at least one non-ferrite metal oxide layer being an interference color imparting layer and being formed by calcination at about 600-800° C.

These pigments may be used to create products having unique color properties, e.g. three-dimensional image films. The novel iridescent magnetic pigments are unlike traditional magnetic pigments that impart a black-brown effect. If desired, the magnetic pigments may be oriented in or on products during formation thereof using magnetic fields to produce various color effects and color patterns.

DETAILED DESCRIPTION

The present patent application is directed to a novel iridescent magnetic effect pigment and a method of making such pigment. The pigments of the present invention can be used to produce novel color patterns or image effects and products possessing such novel color patterns or image effects, e.g. three-dimensional imaging films. The magnetic pigments can be manipulated using magnetic fields to create the color patterns or image effects.

The magnetic pigments of the present invention typically will contain in succession a platelet substrate, a ferrite layer, and a second metal oxide layer. At least one of the layers deposited on the substrate will have magnetic properties. The pigments not only have magnetic properties attributed to use of a magnetic oxide layer, but also iridescent properties attributed to interference from at least one color imparting layer. For example, pigments useful in this invention may be based on platelets coated with the ferrite layer having magnetic properties and the second metal oxide layer being an interference color imparting layer to provide the pigment with iridescent properties. The second metal oxide layer (or the second interference color imparting layer) is the outermost layer which coats the ferrite layer disposed on the substrate.

The substrate used in the present invention is transparent or opaque and made of natural or synthetic materials. Useful substrates may be a platy substrate such as natural mica, synthetic mica, glass flakes, kaolin, $SiO_2$, $Al_2O_3$, and the like. Further examples of usable platelets include bismuth oxychloride, and boron nitride. Useful opaque or metallic substrates include aluminum, stainless steel, titanium, copper, copper alloy, brass, tin, iron, bronze, zinc, zinc alloy, silver, cobalt, and nickel. Other useful substrates include talc, pearl, platelet shaped iron oxide, $TiO_2$ platelets such as disclosed in commonly assigned U.S. Pat. Nos. 4,192,691 and 5,611,851 incorporated herein by reference, or mixtures of substrates such as disclosed in commonly assigned US Patent Application Publication 2004/0123779A1 incorporated herein by reference.

The ferrite layer is a double oxide of iron oxide and another metal oxide. Ferrites generally conform to the formula $MFe_2O_4$ in which M is one or a mixture of metals which can exist in a divalent state such as calcium, strontium, barium, zinc, cadmium, manganese, magnesium, cobalt, nickel, copper, iron and the like. Preferably the metal M is magnetic and is one or a mixture of cobalt, nickel, iron or manganese. The ferrite layer is made by combining a source of the metal M with an iron compound after which the layer is deposited on the substrate and then co-calcined.

The phrase "at least one ferrite layer deposited on the substrate" as used herein means that the ferrite layer may be in direct contact with the substrate or at least one additive or at least one layer may be present between the substrate and the ferrite layer.

Alternatively, the substrate can be initially coated with a hydrous iron compound. At any time prior to the calcining of the iron-coated substrate, a source of the metal M is combined with the reactants. Any source of the metal can be used as long as it does not interfere with the formation of an iron oxide or ferrite coating. Thus, metal oxides, metal salts such as the chloride or sulfate and the like or even metal complexes can be employed. In those instances where the substrate is present in aqueous slurry form, the metal salt is generally one which is soluble in water. A metal sulfate is a preferred source of metal M used in this invention.

The metal source is usually added and the metal deposited on the substrate after the hydrous iron compound has already been deposited. However, if desired, the metal can be added before the hydrous iron compound is caused to deposit on the substrate. After the iron and metal have been deposited, the coated substrate is washed and/or calcined. The ferrite layer is formed by calcination at about 700° C. to 925° C., preferably at about 825° C. to 900° C., most preferably at about 875° C.

The non-ferrite metal oxide layer being an interference color imparting layer is deposited on the ferrite layer coated substrate. The non-ferrite metal oxide layer may contain high refractive index materials having a refractive index from about 2.00 to about 3.10 or low refractive index materials having a refractive index from about 1.30 to about 1.80 or other metal oxides.

Useful high refractive index materials include titanium dioxide, iron oxide, zirconium dioxide, zinc oxide, zinc sulfide, and bismuth oxychloride. The CRC Handbook of Chemistry and Physics, $63^{rd}$ edition reports refractive indices for these high refractive index materials as follows.

| Material | Refractive Index |
|---|---|
| $TiO_2$ - anatase | 2.55 |
| $TiO_2$ - rutile | 2.90 |
| $Fe_2O_3$ - hematite | 3.01 |
| $ZrO_2$ | 2.20 |
| ZnO | 2.03 |
| ZnS | 2.38 |
| BiOCl | 2.15 |

Useful low refractive index materials include silicon dioxide, magnesium fluoride, aluminum oxide and the like. The CRC Handbook of Chemistry and Physics, $63^{rd}$ edition reports refractive indices for these low refractive index materials as follows.

| Material | Refractive Index |
|---|---|
| $SiO_2$ - amorphous | 1.46 |
| $MgF_2$ | 1.39 |
| $Al_2O_3$ | 1.76 |

The second metal oxide layer may also include ferrites. The individual layers can be applied to the coated substrate using techniques well known in the art.

The coating conditions and procedures and calcining conditions and procedures are all individually well known in the art. See, e.g., U.S. Pat. Nos. 3,087,828; 3,087,829; 6,139,615; and 6,361,593. The second metal oxide layer may be formed by calcination at about 600-800° C., preferably at about 650° C. to 750° C. most preferably at or up to about 700° C. to provide interference color.

The phrase "at least one non-ferrite metal oxide layer deposited on the ferrite layer" as used herein means that the non-ferrite metal oxide layer may be in direct contact with the ferrite layer or at least one additive or other layer may be present between the ferrite layer and the non-ferrite metal oxide layer. If the non-ferrite metal oxide layer is to be rutile titanium dioxide, an additive that is a rutile director for titanium dioxide such as tin may be present between the ferrite layer and the titanium dioxide. Additives include rutile directors for titanium dioxide such as tin. Useful rutile directors are disclosed in commonly assigned U.S. Pat. Nos. 4,038,099 and 5,433,779 incorporated herein by reference.

The second metal oxide coating is in the form of a thin film deposited on the ferrite layer. The resulting pigment has the optical properties of thin films and thus the color reflected by the pigment arises from light interference, which is dependent on the thickness of the second metal oxide coating.

It may be convenient to coat the substrate with the ferrite layer and the second metal oxide layer seriatim without isolation of each intermediate product by changing the pH with a suitable reagent such as sodium hydroxide or hydrochloric acid. Thus, the pigment of the present invention may be made by first coating the substrate with a hydrous metal mixture to form the ferrite layer via pH adjustments and calcination. The ferrite layer is then coated with a hydrous mixture of the second metal oxide via pH adjustments and calcined. It is important to calcine the layers at the specified temperature and to coat the substrate in the specified sequence. If coated in reverse, an undesirable reaction can occur between the layers. Calcining the layers at higher temperatures can result in undesirable results.

In creating the pigment of the present invention, the number of layers of each the ferrite layer and the second metal oxide layer on the substrate may vary. For instance, more than one ferrite layer may coat the substrate with at least one second metal oxide layer deposited thereon. Alternatively, there may be one ferrite layer deposited on the substrate and more than one second metal oxide layers deposited thereon. It is also possible for the pigment to have more than one ferrite layer coating the substrate and more than one second metal oxide layer deposited on the ferrite layers.

The second metal oxide layer of the pigment of the present invention may be coated in any order and with any number of other metal oxides. For instance, a ferrite layer may be deposited on the second metal oxide layer of the pigment, which is then coated by an additional second metal oxide layer.

The pigment of the present invention whether or not being coated with other metal oxides can be treated with an agent for realization of improved humidity resistance and weatherability. Commonly assigned U.S. Pat. No. 5,759,255 describes these coating agents and is herein incorporated by reference in its entirety. For example, useful coating agents include silane coupling agents such as aminosilanes, alkoxysilaned and aminoalkoxysilanes, as well as silane coupling agents combined with a metal oxide such as an aluminum oxide or an aluminum-cerium oxide.

The products of the present invention can be used in any application where pearlescent pigments have been used heretofore. Thus, the products of this invention have an unlimited use in all types of automotive and industrial paint applications, especially in the organic color coating and inks field where deep color intensity is required. For example, these pigments can be used in mass tone or as styling agents to spray paint all types of automotive and non-automotive vehicles. For automotive formulations, the weatherability treatment as described in U.S. Pat. No. 5,759,255 is particularly useful. Similarly, they can be used on all clay/formica/wood/glass/metal/enamel/ceramic and non-porous or porous surfaces. The pigments can be used in powder coating compositions. They can be incorporated into plastic articles geared for the toy industry or the home. These pigments can be impregnated into fibers to impart new and esthetic coloring to clothes and carpeting. They can be used to improve the look of shoes, rubber and vinyl/marble flooring, vinyl siding, and all other vinyl products. In addition, these colors can be used in all types of modeling hobbies.

The above-mentioned compositions in which the compositions of this invention are useful are well known to those of ordinary skill in the art. Examples include printing inks, nail enamels, lacquers, thermoplastic and thermosetting materials, natural resins and synthetic resins. Some non-limiting examples include polystyrene and its mixed polymers, polyolefins, in particular, polyethylene and polypropylene, polyacrylic compounds, polyvinyl compounds, for example polyvinyl chloride and polyvinyl acetate, polyesters and rubber, and also filaments made of viscose and cellulose ethers, cellulose esters, polyamides, polyurethanes, polyesters, for example polyglycol terephthalates, and polyacrylonitrile.

Application of pigments is varied. For a well-rounded introduction to a variety of pigment applications, see Temple C. Patton, editor, The Pigment Handbook, volume II, Applications and Markets, John Wiley and Sons, New York (1973). In addition, see for example, with regard to ink: R. H. Leach, editor, The Printing Ink Manual, Fourth Edition, Van Nostrand Reinhold (International) Co. Ltd., London (1988), particularly pages 282-591; with regard to paints: C. H. Hare, Protective Coatings, Technology Publishing Co., Pittsburgh (1994), particularly pages 63-288. The foregoing references are hereby incorporated by reference herein for their teachings of ink, paint and plastic compositions, formulations and vehicles in which the compositions of this invention may be used including amounts of colorants. For example, the pigment may be used at a level of 10 to 15% in an offset lithographic ink, with the remainder being a vehicle containing gelled and ungelled hydrocarbon resins, alkyd resins, wax compounds and aliphatic solvent. The pigment may also be used, for example, at a level of 1 to 10% in an automotive paint formulation along with other pigments which may include titanium dioxide, acrylic lattices, coalescing agents, water or solvents. The pigment may also be used, for example, at a level of 20 to 30% in a plastic color concentrate in polyethylene.

In the cosmetic and personal care field, these pigments may be used in the eye area and in all external and rinse-off applications. Thus, they may be used in hair sprays, face powder, leg-makeup, insect repellent lotion, mascara cake/cream, nail enamel, nail enamel remover, perfume lotion, and shampoos of all types (gel or liquid). In addition, they can be used in shaving cream (concentrate for aerosol, brushless, lathering), skin glosser stick, skin makeup, hair groom, eye shadow (liquid, pomade, powder, stick, pressed or cream), eye liner, cologne stick, cologne, cologne emollient, bubble bath, body lotion (moisturizing, cleansing, analgesic, astringent), after shave lotion, after bath milk and sunscreen lotion.

The pigments of the present invention may be useful in creating three-dimensional image effects or products with three-dimensional image effects as well as a plethora of other items. The pigments of the present invention may be used to create any number of unique designs or color patterns/effect either in or on products. These pigments may be directly incorporated within, or coated on an article including solid surfaces; electronic encasings for computers, telephones, televisions, radios, cameras; product casings such as cosmetic containers, food containers, vehicles, and architectural panels; etc. There is no intent to limit the types of articles that are to be prepared with the color effects of this invention.

As a means of producing the designs or color patterns/effects having iridescent properties the pigments may be manipulated using magnets placed near the pigment to influence the pigments to move or orientate. There is no limit as to the number of magnets required in this invention as one or more magnets may be employed herein. The magnetic fields may be applied in a variety of ways to create the magnetic fields that affects the movement and orientation of the pigments. Thus, the magnets may be permanently fixed or moved relative to the design being formed. For instance, one fixed magnet may be employed or a plurality of fixed magnets or a combination of fixed and moving magnets.

Articles coated with the present pigments may impart a 3-D effect. The articles are coated using technique know in the art. For instance, the present pigments are mixed into a coating medium, such as paint. The paint is then sprayed on the article or substrate. Magnets are placed behind, or otherwise near, the substrate to move and orient the pigments in a desired manner imparting a 3-D image.

Specific concentrated pigment patterns may be created in a medium containing pigments when the magnets are permanently fixed and placed strategically to draw the pigments to a specific location. Unique flowing color patterns/effects having iridescent properties may be created by moving the magnets relative to the article, coating or design being formed. The moving magnets may travel linearly or non-linearly about the article or design being formed and may have a starting point as well as a destination point. When magnets are moved, it may be done either gradually or rapidly and either at constant times or during timed intervals. For instance, the magnets may be stationary for certain periods of time and moving for other periods of time. Furthermore, combinations of both moving and fixed magnets may be employed to form a multitude of color patterns/effects having iridescent properties. Alternatively, articles or mediums possessing the pigments of this invention that are being formed may be moved relative to fixed or moving magnets.

The movement of the magnets and the magnetic field or fields created dictates the configuration of the color patterns.

By pulling the pigments in any number of ways, unique and attractive color patterns can be created in the medium.

It should be remembered that simultaneous with the movement of pigments, the medium within which the pigments are incorporated gradually hardens and thus layered color patterns may be created during the run of the invention. The movement and orientation of the pigment with the concurrent hardening of the medium makes it foreseeable that exponential color patterns and numerous dramatic color effects can potentially be produced.

A method of creating products having color patterns/effects using iridescent magnetic pigments involves creating magnetic pigments then mixing together a fluid medium and the magnetic pigments to form a combination or mixture. The mixture is stirred to disperse the pigments in the medium. The mixture can then be shaped, e.g. molded, into an article. A magnetic field, as described above, is applied near the mixture to influence the movement and orientation of the pigments. The fluid medium and pigment mixture is allowed to harden or set into the formed article. After the mixture sets or hardens into an article, unique color patterns are discerned as a result of the pigment migration due to the magnetic field being applied.

Thus, when molded articles possessing unique color patterns are created, magnets may be selectively placed around the mold prior to or while the medium is being dispersed or even after the medium is fully inserted in the mold. Similarly, when articles are formed via extrusion, magnets may be placed adjacent the shaping die. The magnets may be placed upstream and/or downstream the extrusion die. In any case, the magnetic field causes the flow of magnetic particles within the fluid medium during the formation of the article and thereby produces articles possessing unique color patterns.

If the present pigments are used in a medium, the medium may be shaped using techniques known in the art including compression molding, injection molding, blow molding, spinning, vacuum forming and calendaring, thermoforming and rotational molding, as well as extrusion into sheets, films, fibers, rods, tubes and other cross-sectional profiles of various lengths. The present pigments may be used to create three dimensional effects in or on objects such as in forming molded plastic components, films, glitter made from the film, casings for electronics or automotive parts as well as packaging and containers. Again, no attempt is made to limit the ways in which the medium is formed or the colors patterns formed by the present invention.

In order to further illustrate the present invention, various examples are set forth below. In these examples, as throughout these specification and claims, all temperatures are degree Centigrade and parts and percentages are by weight unless otherwise indicated.

EXAMPLE 1

20% Cobalt Ferrite with Red Interference Color

A slurry of 100 g of natural mica (average particle size 20 microns) in 666 mL of distilled water was heated to 78° C. and the pH was adjusted to 3.2 with an HCl solution. A solution of 70.9 g of 39% $FeCl_3$ was added to the slurry at 0.6 ml/min and the pH was maintained with aqueous NaOH. After the addition was complete, the NaOH solution was then used to raise the pH to 9.2. Then 62.8 g of a $CoSO_4$ solution (8% as Co) was added at 0.5 mL/min with the pH maintained with NaOH. The slurry was then filtered, washed, and calcined at 875° C. The product from the first step was silvery black in color and was magnetic.

A slurry with 100 g of product from the first step in 666 mL of distilled water had the pH lowered to 2.5 with an HCl solution. Then, 1.1 g of a 78.1% $SnCl_4$ solution was added, followed by heating to 83° C. A $TiCl_4$ solution was then added at 0.89 mL/min until the slurry had developed a purple color. After filtering, washing, and calcining at 700° C., a magnetic pigment with a red interference color was produced.

The final interference color may be varied depending on the amount of $TiCl_4$ solution employed.

Figure 1:
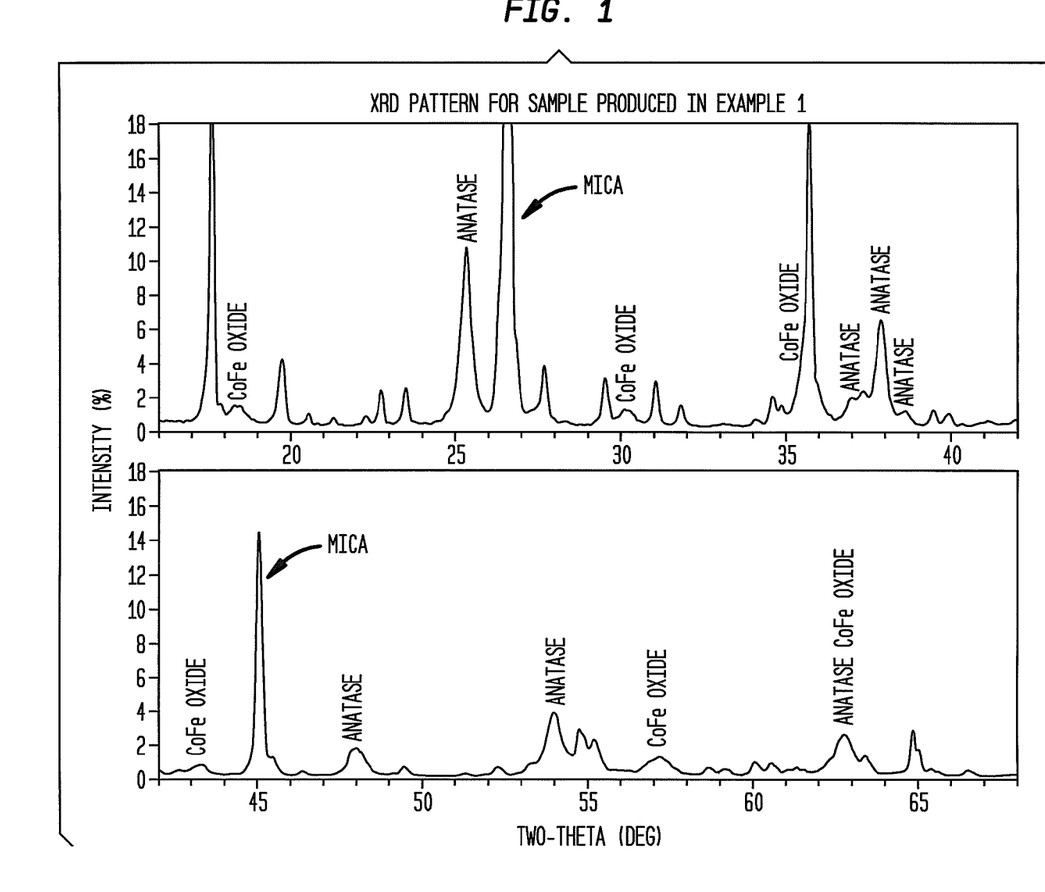
FIG. 1 is an XRD of the magnetic pigment of Example 1.

FIG. 1 is an XRD of the resulting magnetic pigment.

EXAMPLE 2

10% Cobalt Ferrite with Blue Interference Color

A slurry of 100 g of natural mica (average particle size 20 microns) in 666 mL of distilled water was heated to 78° C. and the pH was adjusted to 3.2 with an HCl solution. A solution of 35.45 g of 39% $FeCl_3$ was added to the slurry at 0.6 ml/min and the pH was maintained with aqueous NaOH. After the addition was complete, the NaOH solution was then used to raise the pH to 9.2. Then 31.4 g of a $CoSO_4$ solution (8% as Co) was added at 0.5 mL/min with the pH maintained with NaOH. The slurry was then filtered, washed, and calcined at 875° C. The product from the first step was silvery black in color and was magnetic.

A slurry with 100 g of product from the first step in 666 mL of distilled water had the pH lowered to 2.5 with an HCl solution. Then, 0.97 g of a 78.1% $SnCl_4$ solution was added, followed by heating to 83° C. A $TiCl_4$ solution was then added at 1.0 mL/min until the slurry had developed a green color. After filtering, washing, and calcining at 700° C., a magnetic pigment with a blue interference color was produced.

The final interference color may be varied depending on the amount of $TiCl_4$ solution employed.

Figure 2:
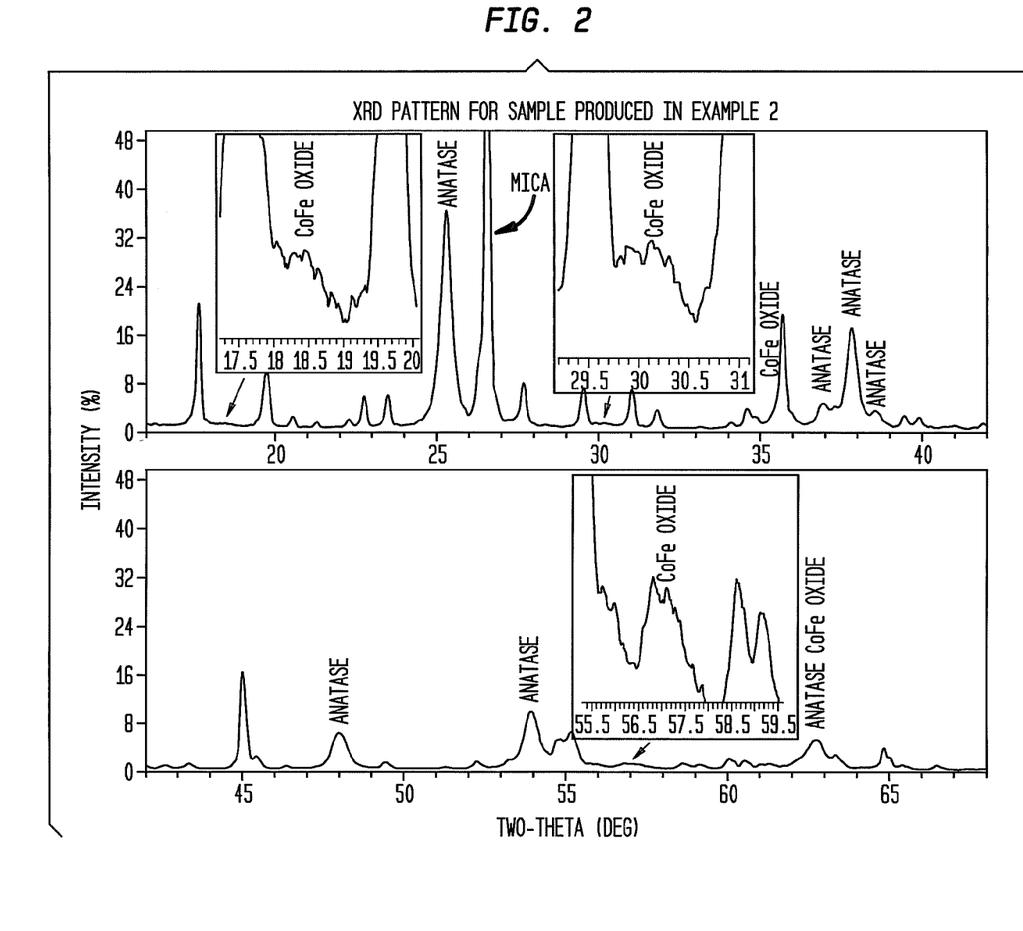
FIG. 2 is an XRD of the magnetic pigment of Example 2.

FIG. 2 is an XRD of the resulting magnetic pigment.

EXAMPLE 3

The product of Example 1 above was provided with the following treatment for exterior use. A slurry of 100 g of the product of Example 1 in 666 mL of distilled water was heated to 78° C. and the pH was adjusted to 3.1 with an HCl solution. Then, 1 gram of a 20% cerium nitrate solution and 3.5 g of a 4.3% aluminum nitrate solution were added. After raising the pH to 6.5, 1.5 g of 3-glycidoxypropyl)trimethoxysilane and 1.5 g of 3-aminopropyltriethoxysilane were pumped in. After one hour, the slurry was filtered and washed and the cake was dried at 120° C. for 2 hours. The product passed weather testing.

EXAMPLE 4

The product of Example 2 above was provided with the exterior use treatment described in Example 3. The product passed weather testing.

EXAMPLE 5

Example 1 above was repeated except that at the end, 50 mL portions of the slurry were filtered and the cake was calcined at various temperatures. The samples were calcined at 725° C., 750° C., 775° C., 800° C., 825° C., and 850° C.

Each sample was magnetic. As the calcination temperature increased, the sample color shifted from red to orange to golden.

XRD analysis indicates that the titania coating phase continued as anatase to 750° C., then started converting to rutile at 775° C. and was completely converted to rutile by 850° C. The $CoFe_2O_4$ also started converting to $Fe_2CoTi_3O_{10}$ at this same temperature (775° C.).

Figure 3:
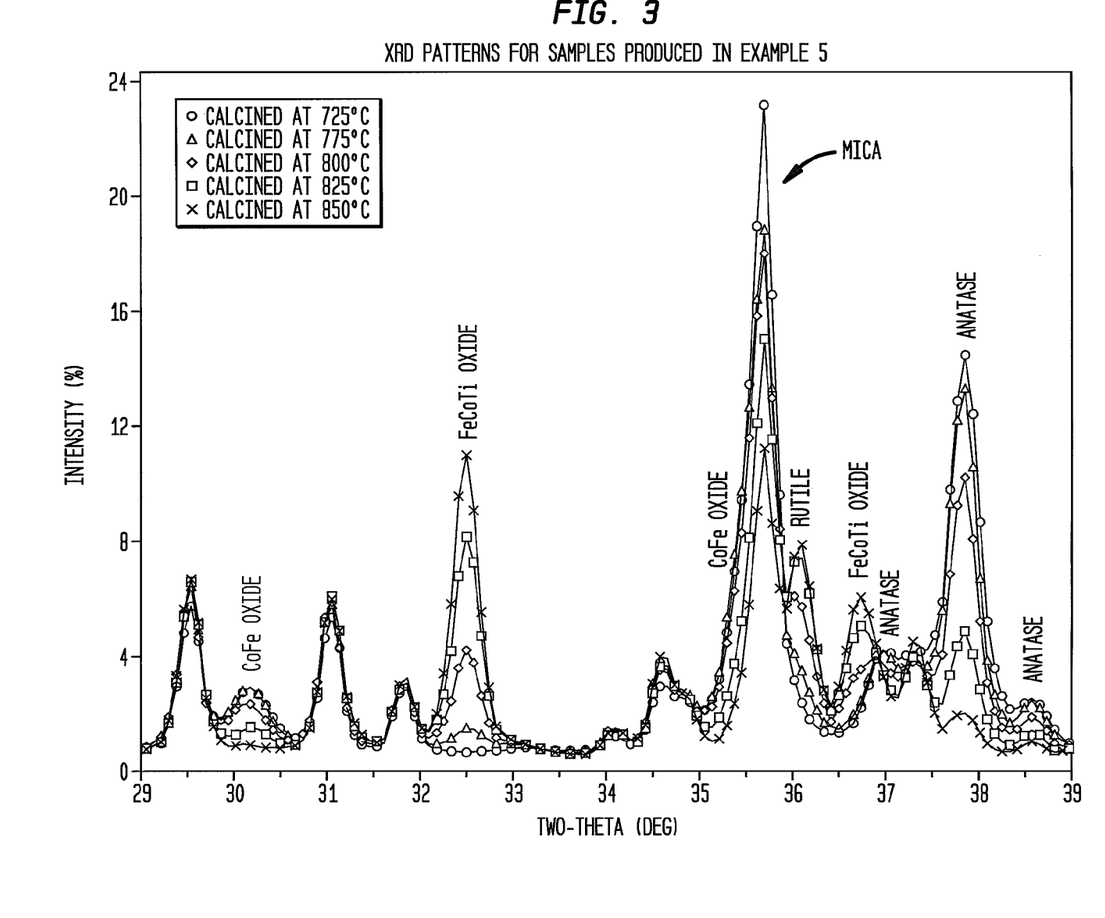
FIG. 3 is an XRD of the magnetic pigment of Example 5.

FIG. 3 is an XRD of the resulting magnetic pigment.

COMPARATIVE EXAMPLE A

Example 1 above was repeated except that the pH for titanium dioxide deposition was 1.9 instead of 2.5 and the titanium dioxide calcination temperature was 850° C. instead of 700° C.

XRD analysis indicated that the titania phase was mostly rutile with a small amount of anatase and the $CoFe_2O_4$ had also converted to iron cobalt titanium oxide ($Fe_2CoTi_3O_{10}$). Because $CoFe_2O_4$ was not present in the resulting product, the resulting product was not magnetic and had a different color compared with the product of Example 1.

Figure 4:
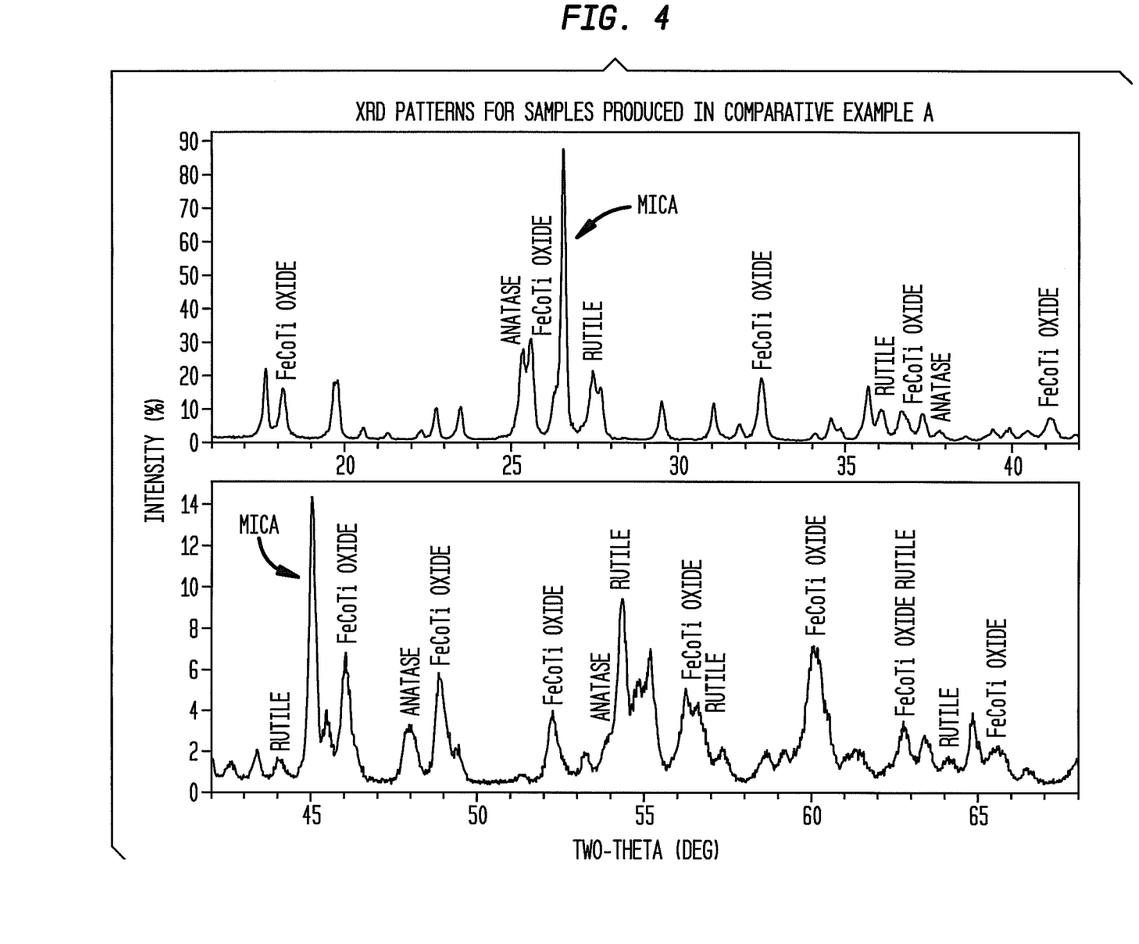
FIG. 4 is an XRD of the non-magnetic pigment of Comparative A.

FIG. 4 is an XRD of the resulting non-magnetic pigment.

EXAMPLE 6

Example 1 above was repeated except that synthetic mica instead of natural mica was used.

The resulting product was a magnetic pigment with a red interference color.

Figure 5:
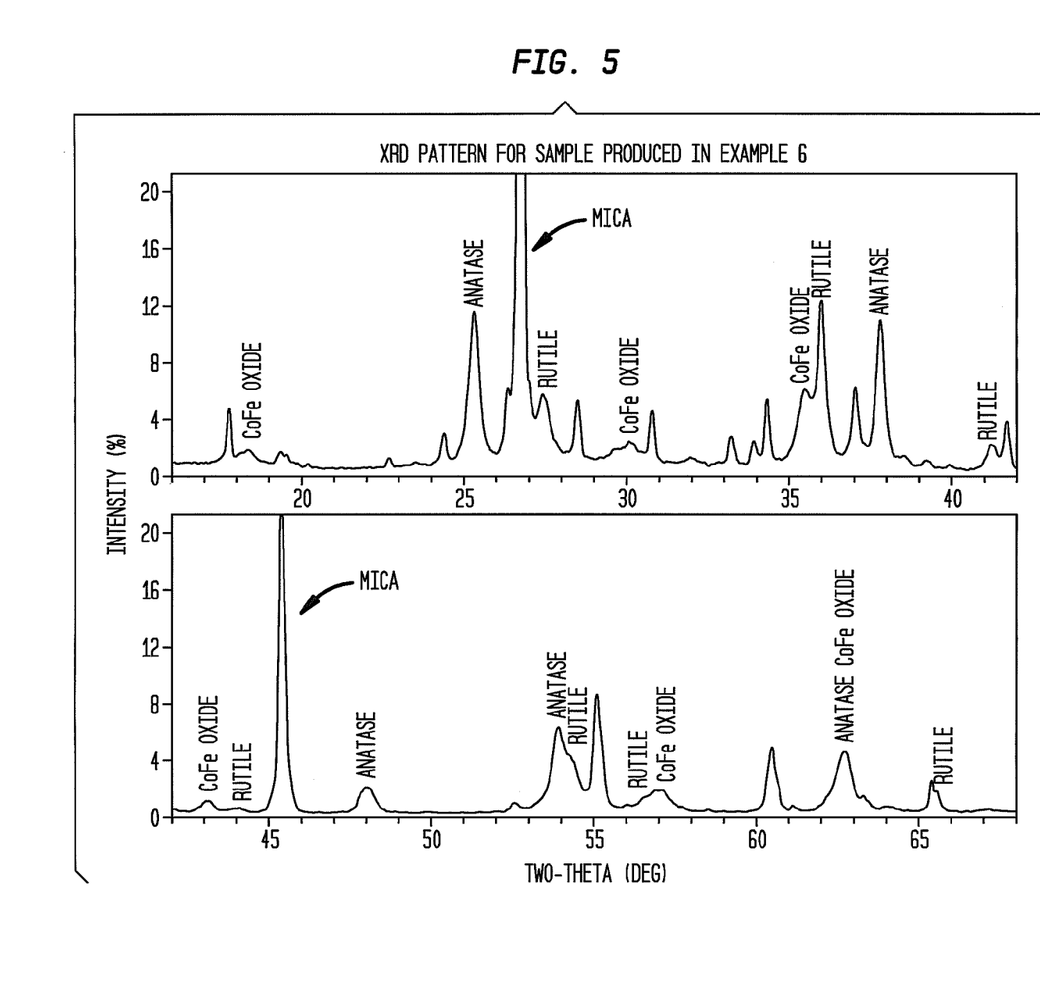
FIG. 5 is an XRD of the magnetic pigment of Example 6.

FIG. 5 is an XRD of the resulting magnetic pigment.

EXAMPLE 7

A slurry with 100 g of Vegetable Black Olive in 666 mL of distilled water had the pH lowered to 2.5 with an HCl solution. Then, 1.1 g of a 78.1% $SnCl_4$ solution was added, followed by heating to 83° C. A $TiCl_4$ solution was then added at 0.89 mL/min until the slurry had developed a purple color. After filtering, washing, and calcining at 700° C., a magnetic pigment with a red interference color was produced. The final interference color may be varied depending on the amount of $TiCl_4$ solution employed.

Figure 6:
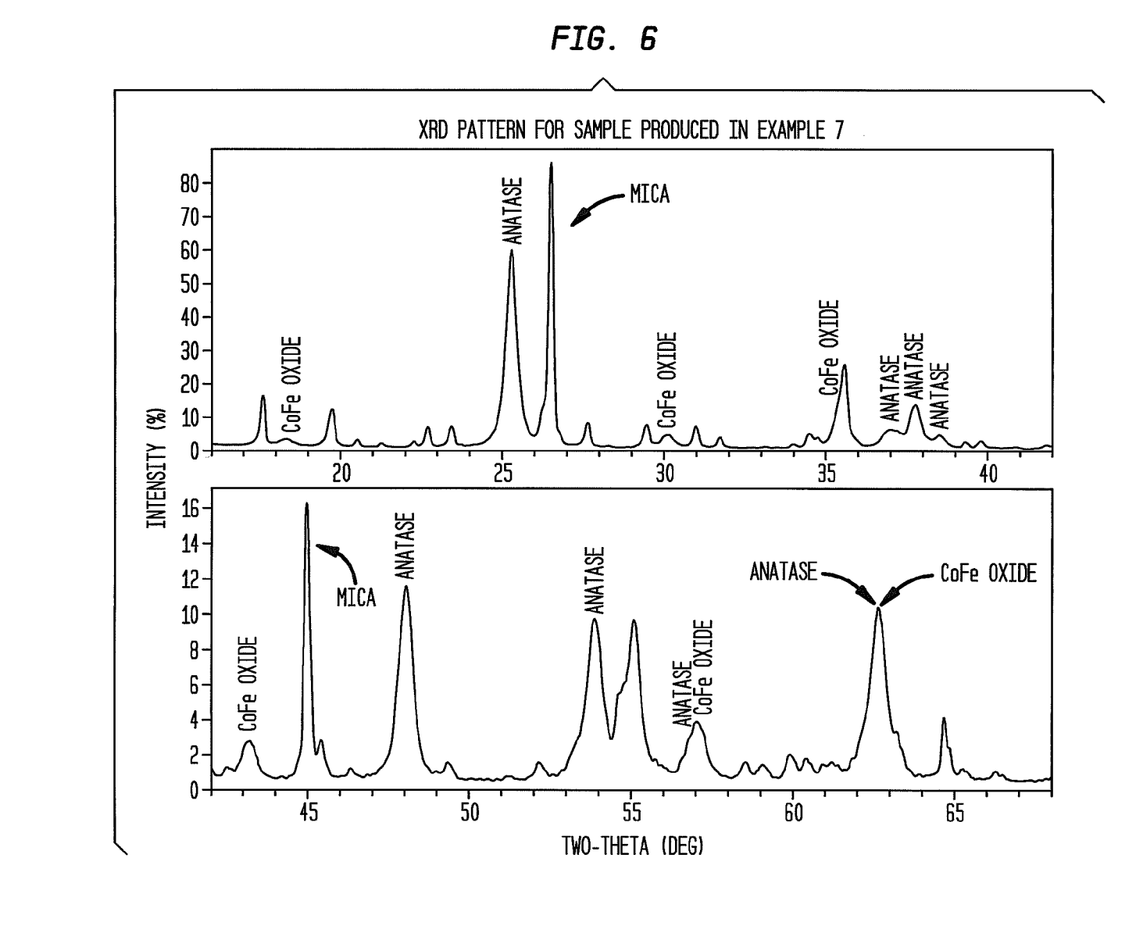
FIG. 6 is an XRD of the magnetic pigment of Example 7.

FIG. 6 is an XRD of the resulting magnetic pigment.

The invention claimed is:

1. A magnetic effect pigment comprising:
   (a) a substrate;
   (b) at least one ferrite layer deposited on said substrate; and
   (c) deposited on said ferrite layer, at least one non-ferrite metal oxide layer being an interference color imparting layer and being formed by calcination at about 600-800° C.

2. The magnetic effect pigment of claim 1 wherein said ferrite layer comprises a double oxide of iron oxide and another metal oxide.

3. The magnetic effect pigment of claim 1 wherein said metal oxide is an oxide of a metal selected from the group consisting of cobalt, nickel, iron, and manganese.

4. The magnetic effect pigment of claim 1 wherein said ferrite layer comprises cobalt ferrite.

5. The magnetic effect pigment of claim 1 wherein the ferrite layer is formed by calcination at about 700° C. to about 925° C.

6. The magnetic effect pigment of claim 1 wherein the ferrite layer is formed by calcination at about 875° C.

7. The magnetic effect pigment of claim 1 wherein the interference color imparting layer comprises titanium dioxide, iron oxide, zirconium dioxide, zinc oxide, zinc sulfide, bismuth oxychloride, silicon dioxide, magnesium fluoride, or aluminum oxide.

8. The magnetic effect pigment of claim 1 wherein the non-ferrite metal oxide layer comprises titanium dioxide.

9. The magnetic effect pigment of claim 1 wherein said non-ferrite metal oxide layer is formed by calcination at up to about 700° C.

10. The magnetic effect pigment of claim 1 wherein the ferrite is cobalt ferrite and the non-ferrite metal oxide is titanium dioxide.

11. The magnetic effect pigment of claim 1 wherein the substrate is mica, glass flake, $SiO_2$, $Al_2O_3$, bismuth oxychloride, or boron nitride.

12. The magnetic effect pigment of claim 1 wherein the substrate is natural mica.

13. The magnetic effect pigment of claim 1 wherein said substrate is synthetic mica.

14. The magnetic effect pigment of claim 1 wherein the substrate is platy.

15. The magnetic effect pigment of claim 1 further comprising an agent to improve weatherabilty of the pigment.

16. The magnetic effect pigment of claim 1 further comprising a metal oxide and silane coupling agent applied onto said metal oxide layer so as to improve weatherabilty of the pigment.

17. The magnetic effect pigment of claim 1 further containing an additional metal oxide layer deposited on the metal oxide layer of the pigment.

18. The magnetic effect pigment of claim 1 further containing a ferrite layer deposited on the non-ferrite metal oxide layer of the pigment.

19. A three-dimensional effect product containing the pigment of claim 1.

20. A method of creating a magnetic pigment comprising the steps of:
   (a) providing a substrate;
   (b) coating a ferrite layer on the substrate; and
   (c) coating an interference color imparting layer containing a non-ferrite metal oxide on the ferrite layer, said non-ferrite metal oxide being formed by calcination at up to about 700° C.

21. The method of claim 20, wherein the ferrite layer is formed by calcination at about 825° C. to about 900° C.

* * * * *